United States Patent
Chen

(10) Patent No.: US 8,444,327 B2
(45) Date of Patent: May 21, 2013

(54) OPTICAL CONNECTOR ADAPTER

(75) Inventor: Szu-Ming Chen, Taipei (TW)

(73) Assignee: Ezconn Corporation, Taipei (TW)

( * ) Notice: Subject to any disclaimer, the term of this patent is extended or adjusted under 35 U.S.C. 154(b) by 122 days.

(21) Appl. No.: 13/071,879

(22) Filed: Mar. 25, 2011

(65) Prior Publication Data

US 2012/0243831 A1    Sep. 27, 2012

(51) Int. Cl.
  *G02B 6/36*    (2006.01)
(52) U.S. Cl.
  USPC .............................................. 385/75; 385/76
(58) Field of Classification Search
  USPC ...................................... 385/75–76
  See application file for complete search history.

(56) References Cited

U.S. PATENT DOCUMENTS

| 5,333,222 | A  | * | 7/1994 | Belenkiy et al. | 385/70 |
| 6,364,537 | B1 | * | 4/2002 | Maynard | 385/75 |
| 6,913,392 | B2 | * | 7/2005 | Grzegorzewska et al. | 385/60 |
| 2005/0201690 | A1 | * | 9/2005 | Taira et al. | 385/53 |
| 2009/0034915 | A1 | * | 2/2009 | Oki et al. | 385/92 |

* cited by examiner

*Primary Examiner* — Eric Wong
(74) *Attorney, Agent, or Firm* — Litron Patent & Trademark Office; Min-Lee Teng

(57) ABSTRACT

An optical connector adapter includes: a first connection member; a second connection member; a sleeve member coaxially disposed in the first and second connection members; an outer shell defining an internal cavity for receiving the first and second connection members, an engagement section being formed on an inner wall face of the internal cavity and inward protruding from the inner wall face for restricting and locating the first connection member, the outer shell being formed with at least one slot in communication with the cavity; and at least one U-shaped clamp member. The U-shaped clamp member can be inserted into the outer shell through the slot to restrict the second connection member so as to securely locate the first and second connection members in the outer shell.

4 Claims, 3 Drawing Sheets

OPTICAL CONNECTOR ADAPTER

BACKGROUND OF THE INVENTION

1. Field of the Invention

The present invention relates generally to an optical connector adapter, and more particularly to an optical connector adapter, in which the outer shell is integrally formed without additional ultrasonic welding process.

2. Description of the Related Art

An optical connector adapter is widely used for optically connecting an optical connector with another optical connector to elongate the optical fiber cable and transmit optical signals to a remote subscriber terminal. Accordingly, the optical connector adapter plays an important role in optical communication.

FIGS. 1A and 1B show a conventional optical connector adapter 10. The conventional optical connector adapter 10 includes: a first outer shell 11, a second outer shell 12 connected with the first outer shell 11 by means of ultrasonic welding; a first connection member 13 disposed in the first outer shell 11, the first connection member 13 having a first inner sleeve 14 and a pair of holding arms 15; a second connection member 16 disposed in the second outer shell 12, the second connection member 16 having a second inner sleeve 17 and a pair of holding arms 18; and a sleeve member 19 coaxially disposed in the first and second inner sleeves 14, 17. A ferrule 21 of an optical connector 20 can be inserted into the sleeve member 19 to optically connect the optical connector 20 with the optical connector adapter 10.

In assembling process, the conventional optical connector adapter 10 has some shortcomings as follows:

First, the second outer shell 12 is connected with the first outer shell 11 by means of ultrasonic welding. As a result, a welding mark is left on the junction between the first and second outer shells 11, 12.

Second, when impacted, the first and second outer shells 11, 12 of the optical connector adapter 10 are likely to detach from each other due to insufficient bonding force of the ultrasonic welding.

Therefore, it is tried by the applicant to provide an optical connector adapter, in which the outer shell is integrally formed without additional ultrasonic welding process. The integrally formed outer shell ensures that the components of the optical connector adapter are securely mechanically connected.

SUMMARY OF THE INVENTION

It is therefore a primary object of the present invention to provide an optical connector adapter, in which the outer shell is integrally formed without additional ultrasonic welding process so that the strength of the optical connector adapter is enhanced.

It is a further object of the present invention to provide the above optical connector adapter including at least one U-shaped clamp member, which can be inserted into the outer shell to securely associate a pair of connection members with the outer shell.

To achieve the above and other objects, the optical connector adapter of the present invention includes: a first connection member; a second connection member; a sleeve member coaxially disposed in a first inner sleeve and a second inner sleeve of the first and second connection members; an outer shell defining an internal cavity for receiving the first and second connection members, an engagement section being formed on an inner wall face of the internal cavity and inward protruding from the inner wall face for engaging with and locating the first connection member, the outer shell being formed with at least one slot in communication with the cavity; and at least one U-shaped clamp member. The U-shaped clamp member can be inserted into the outer shell through the slot to restrict and securely locate the first and second connection members in the cavity of the outer shell.

The present invention can be best understood through the following description and accompanying drawings, wherein:

DETAILED DESCRIPTION OF THE PREFERRED EMBODIMENTS

Figure 1A:
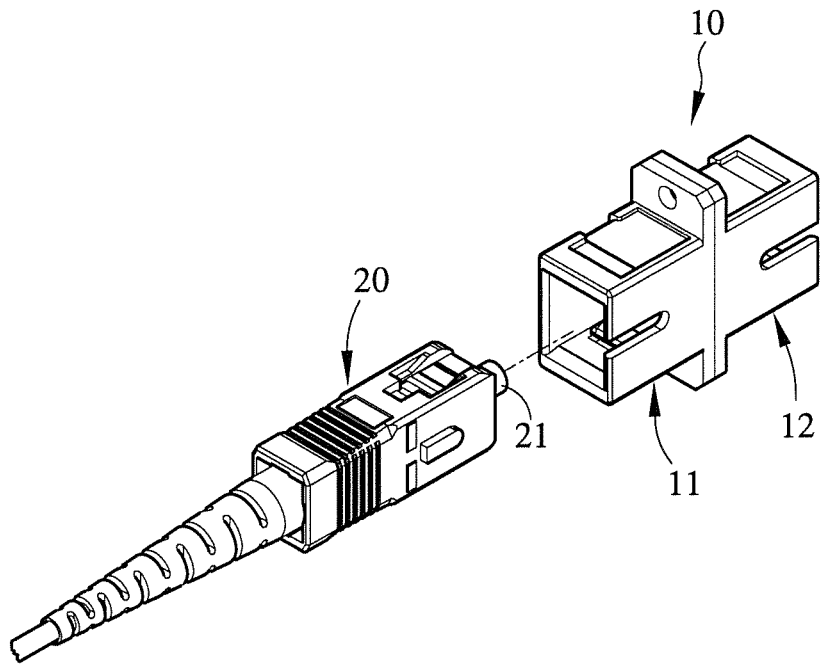
FIG. 1A is a perspective assembled view of a conventional optical connector adapter.
Figure 1B:
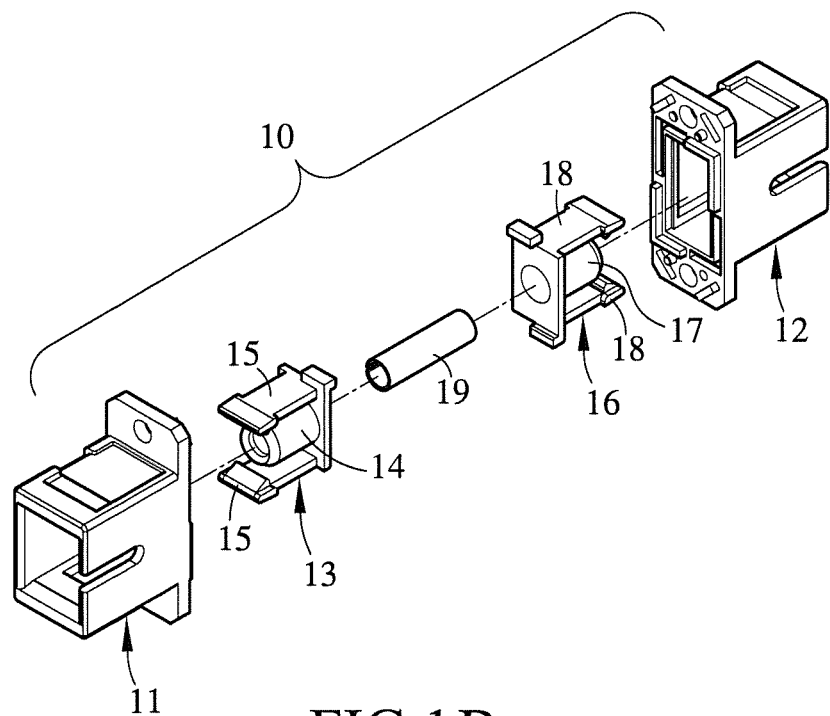
FIG. 1B is a perspective exploded view of the conventional optical connector adapter.
Figure 2:
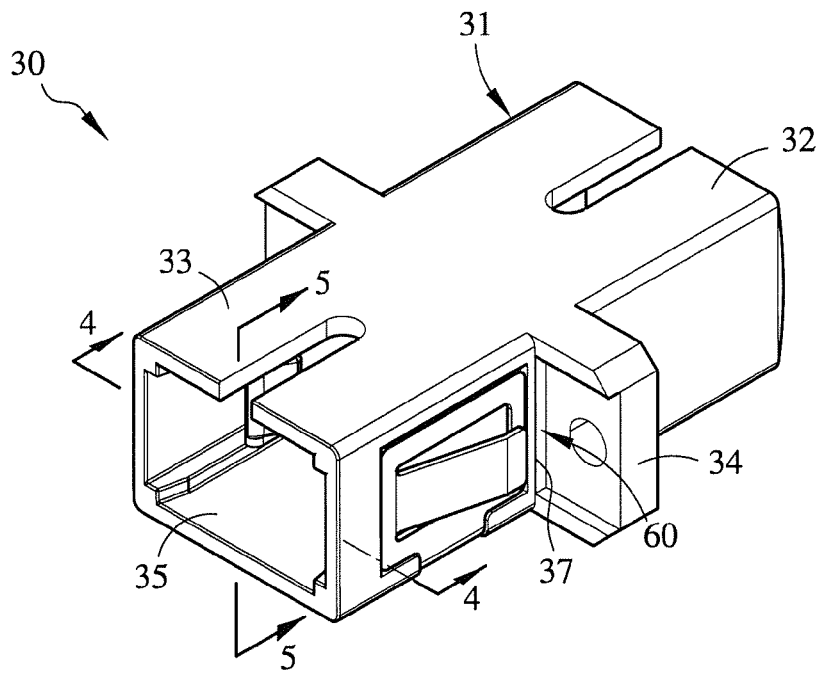
FIG. 2 is a perspective assembled view of the optical connector adapter of the present invention.
Figure 3:
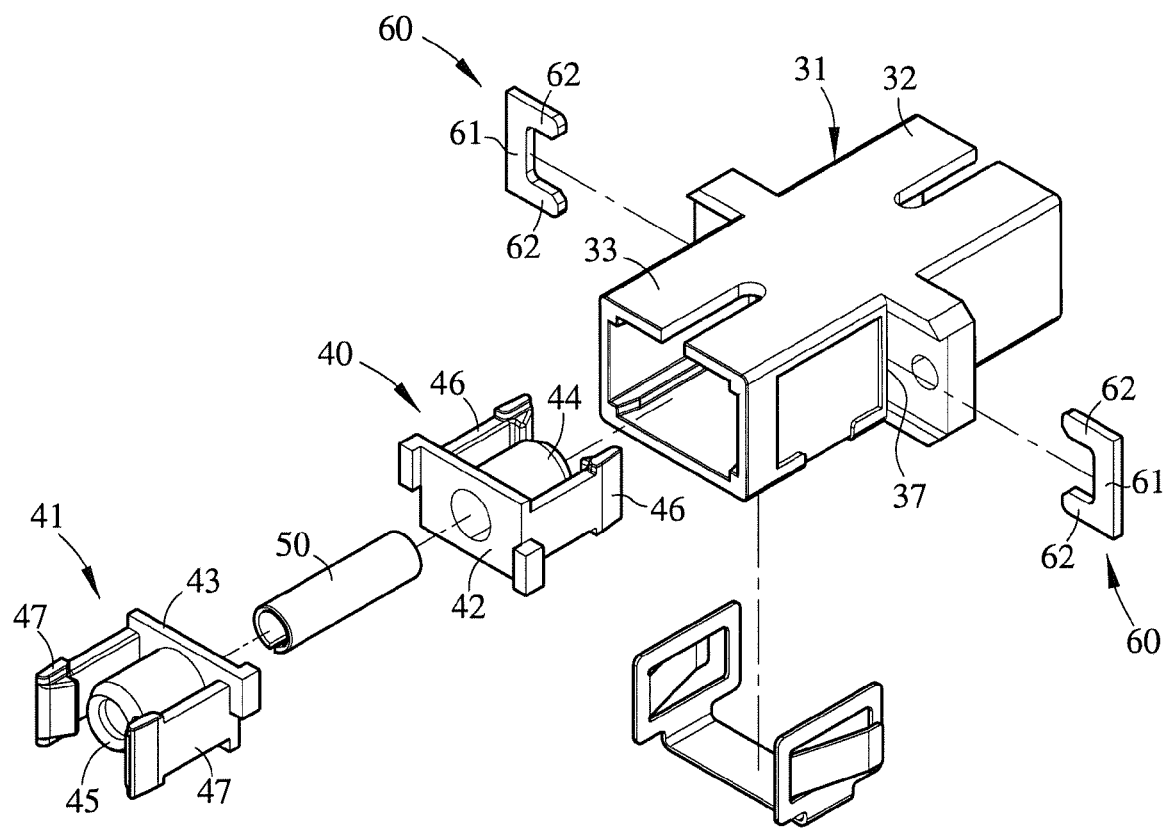
FIG. 3 is a perspective exploded view of the optical connector adapter of the present invention.
Figure 4:
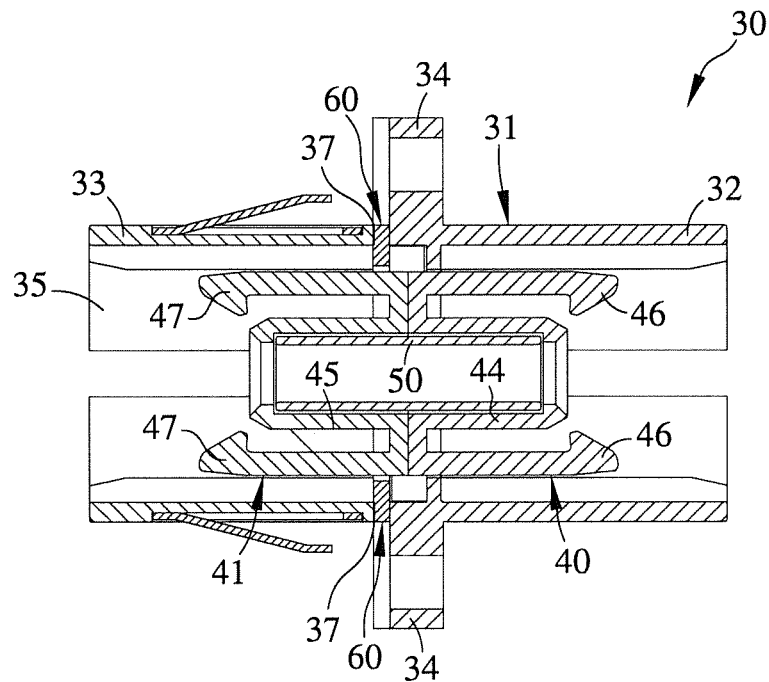
FIG. 4 is a sectional view taken alone line 4-4 of FIG. 2.
Figure 5:
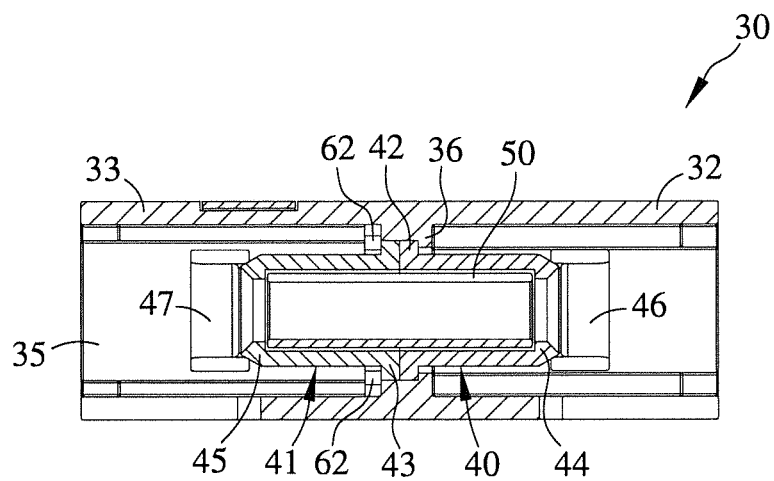
FIG. 5 is a sectional view taken alone line 5-5 of FIG. 2.

Please refer to FIGS. 2, 3, 4 and 5. FIG. 2 is a perspective assembled view of the optical connector adapter of the present invention. FIG. 3 is a perspective exploded view of the optical connector adapter of the present invention. FIG. 4 is a cross-sectional view of the optical connector adapter of the present invention. FIG. 5 is a longitudinal sectional view of the optical connector adapter of the present invention. The optical connector adapter 30 of the present invention includes an outer shell 31, a first connection member 40 and a second connection member 41. The first and second connection members 40, 41 are positioned in the outer shell 31. The optical connector adapter 30 further includes a sleeve member 50 coaxially disposed in the first and second connection members 40, 41. The optical connector adapter 30 further includes at least one U-shaped clamp member 60, which can be inserted into the outer shell 31 to restrict the first and second connection members 40, 41 and securely locate the first and second connection members 40, 41 in the outer shell 31.

The outer shell 31 defines an internal cavity 35 for receiving the first and second connection members 40, 41. The outer shell 31 has a first connection port 32 for an optical connector to insert and connect therein, a second connection port 33 for another optical connector to insert and connect therein and a pair of lugs 34 disposed between the first and second connection ports 32, 33 for fixing the outer shell 31 in an optical fiber closure. An engagement section 36 is formed on an inner wall face of the outer shell 31 and inward protrudes from the inner wall face. The outer shell 31 has at least one slot 37 positioned between the first and second connection ports 32, 33 in communication with the cavity 35 of the outer shell 31.

The first and second connection members 40, 41 have exactly identical structures. Each of the first and second connection members 40, 41 has an end board 42, 43, an inner sleeve 44, 45 disposed on the end board 42, 43 and a pair of holding arms 46, 47 disposed on two sides of the first inner sleeve 44, 45. When two optical connectors are respectively inserted into the first and second connection ports 32, 33 of the outer shell 31, the holding arms 46, 47 serve to engage with and fixedly hold the optical connectors. Under such circumstances, the ferrules of the optical connectors are inserted into the sleeve member 50 and optically connected with each other.

The first and second connection members 40, 41 are sequentially placed into the cavity 35 of the outer shell 31 until the upper and lower edges of the end board 42 of the first connection member 40 contact with the engagement section 36. At this time, the end board 42 is stopped from further moving forward by the engagement section 36, whereby the first connection member 40 is positioned in the first connection port 32, while the second connection member 41 is positioned in the second connection port 33.

The U-shaped clamp member 60 has a plate-shaped main body 61 and two lateral arms 62 respectively disposed at two ends of the main body 61. The clamp member 60 can be inserted into the outer shell 31 through the slot 37, whereby the two lateral aims 62 can engage with and restrict the end board 43 of the second connection member 41 to clamp the two end boards 42, 43 between the engagement section 36 and the lateral arms 62. Accordingly, the first and second connection members 40, 41 are securely located in the cavity 35 of the outer shell 31. In this embodiment, there is a pair of clamp members 60 as shown in FIGS. 2 to 5. The clamp members 60 are respectively inserted into the outer shell 31 through the slots 37 to securely restrict the second connection member 41 to its true position.

In conclusion, the outer shell 31 of the optical connector adapter 30 is an integrally formed structure so that the strength of the optical connector adapter 30 against external force is greatly enhanced. In addition, the appearance of the optical connector adapter 30 is free from any welding mark. Also, at least one U-shaped clamp member 60 is used to securely associate the first and second connection members 40, 41 with the outer shell 31.

The above embodiments are only used to illustrate the present invention, not intended to limit the scope thereof. Many modifications of the above embodiments can be made without departing from the spirit of the present invention.

What is claimed is:

1. An optical connector adapter for optically connecting two optical connectors, the optical connector adapter comprising:

a first connection member having an end board, a first inner sleeve disposed on the end board and a pair of holding arms disposed on two sides of the first inner sleeve;

a second connection member having an end board, a second inner sleeve disposed on the end board of the second connection member and a pair of holding arms disposed on two sides of the second inner sleeve;

a sleeve member coaxially disposed in the first and second inner sleeves;

an outer shell having an internal cavity for receiving the first and second connection members with the respective end boards thereof bearing against one another, an engagement section being formed on an inner wall face of the internal cavity and inward protruding from the inner wall face for engaging with and locating the end board of the first connection member, the outer shell further having a first connection port for connecting with an optical connector and a second connection port for connecting with another optical connector, the outer shell further having at least one slot in communication with the internal cavity of the outer shell; and at least one U-shaped clamp member, inserted into the outer shell through the slot to restrictively engage the end boards of the first and second connection members to securely capture the first and second connection members against the engagement section in the outer shell.

2. The optical connector adapter as claimed in claim 1, wherein the U-shaped clamp member has a plate-shaped main body and two lateral arms respectively disposed at two ends of the main body, whereby when the clamp member is inserted into the outer shell through the slot, the clamp member restricts and securely locates the first and second connection members in the outer shell.

3. The optical connector adapter as claimed in claim 1, comprising a pair of the U-shaped clamp members inserted through corresponding ones of the slots at opposing sides of the outer shell.

4. The optical connector adapter as claimed in claim 1, wherein the end boards of the first and second connection members are each formed with tabbed extensions mutually engaging in nested manner when the first and second connection members are captured within the outer shell.

* * * * *